H. L. LARSON.
FLAX DESEEDING MACHINE.
APPLICATION FILED JAN. 15, 1919.
1,408,896.
Patented Mar. 7, 1922.
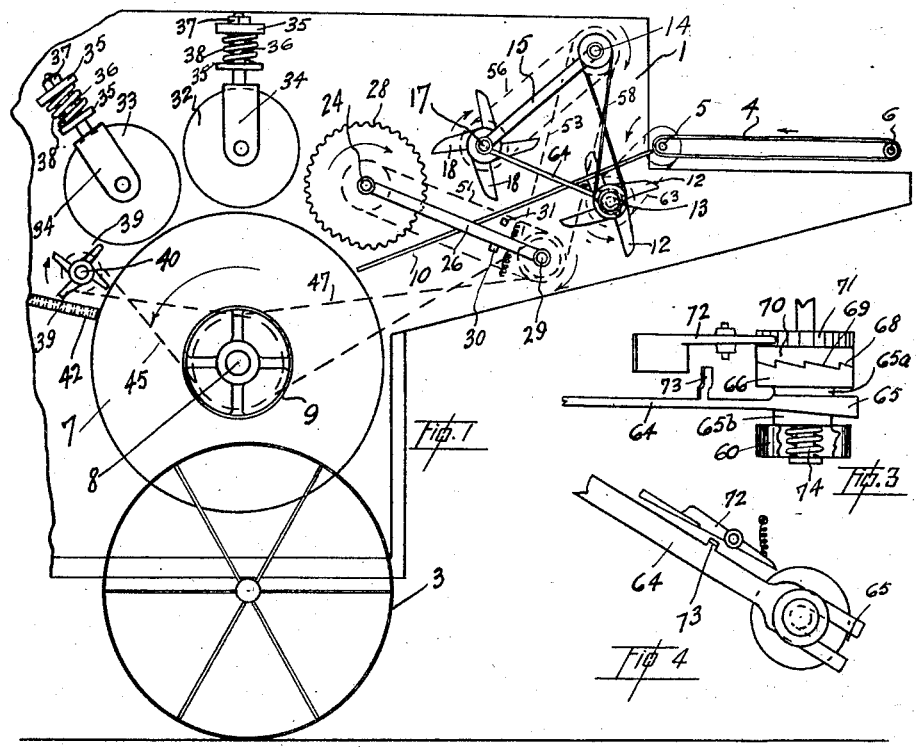
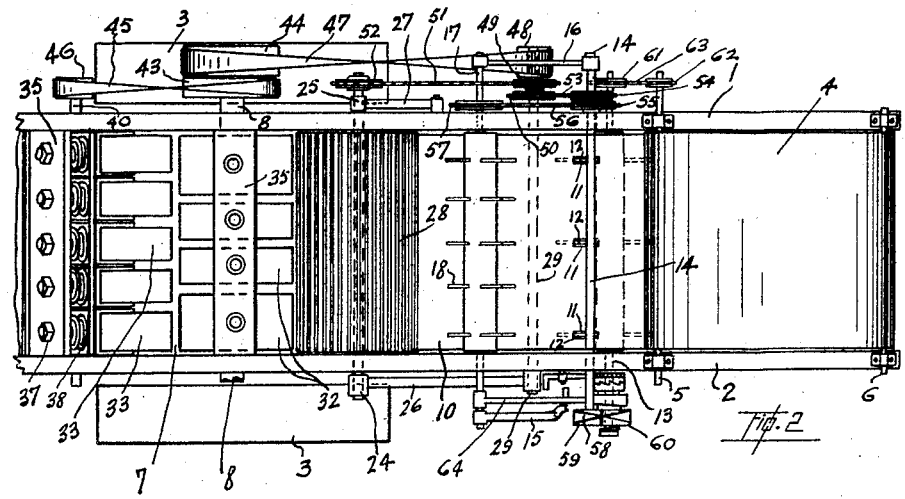
INVENTOR
Hokan Ludvig Larson.

000# UNITED STATES PATENT OFFICE.

HOKAN LUDVIG LARSON, OF SARDIS, BRITISH COLUMBIA, CANADA.

FLAX-DESEEDING MACHINE.

1,408,896. Specification of Letters Patent. Patented Mar. 7, 1922.

Application filed January 15, 1919. Serial No. 271,212.

*To all whom it may concern:*

Be it known that I, HOKAN LUDVIG LARSON, a citizen of the United States, and a resident of the town of Sardis, in the Province of British Columbia, Canada, have invented certain new and useful Improvements in Flax-Deseeding Machines, of which the following is a specification.

My invention relates to improvements in machines for removing and separating the seeds from flax bolls, and the object of my invention is to provide a machine which will accomplish this purpose in a highly practical and efficient manner without tearing the fibre in the straw.

I attain this object by the construction illustrated in the accompanying drawings in which—

Fig. 1 is a side elevation of my machine.
Fig. 2 is a plan view.
Fig. 3 is a detail plan view of the retarder clutch.
Fig. 4 is a side view of Fig. 3.

Similar figures of reference indicate similar parts throughout the several views.

1 and 2 indicate the side frames of the machine, mounted on the carrying wheels 3 at the rear end of which is located a forwardly travelling conveyor 4, which may be of the belt or other suitable type, the head and tail end shafts being indicated by the numerals 5 and 6 respectively. 7 indicates the main roller of the machine, mounted on a shaft 8 rotatably supported on the side frames and provided on one end with a pulley 9 by means of which the roller may be driven from any suitable source of power. Extending between the roller 7 and the head end of the conveyor, as shown, is an inclined chute 10 provided adjacent its upper end with slots 11 through which extend "retarder" fingers 12, these fingers being secured to and spaced along a shaft 13 rotatably mounted transversely of the machine and under the chute 10.

14 indicates a transverse shaft on which are swingably mounted arms 15 and 16 in the lower end of which is mounted a "distributor" shaft 17 provided with spaced fingers 18 similar to the "retarder" fingers the points of which are designed to pass over the upper surface of chute 10 as the shaft 17 is rotated. Rotatably mounted in front of the "distributor" fingers adjacent the periphery of the main roller 7 and transversely of the same in bearings 24 and 25 formed on the upper ends of arms 26 and 27 is a heavy corrugated roller 28, this roller being capable of upward movement due to the pivotal mounting of the lower ends of its supporting arms 26 and 27 on a transverse shaft 29, the upward movement being, however, limited by the provision of stops 30 and 31 between which the arms operate.

32 and 33 indicate heavy crushing rollers arranged in series above the roller 7 as shown in Figure 2, the rollers of one series being staggered with relation to the rollers of the other, all of the rollers being, however, independent of each other and resiliently mounted in forks 34 hung from transverse bars 35 by the rods 36 and nuts 37 so as to be adjustable as to spacing from the periphery of the main roller by the adjustment of the nuts 37, the resilient mounting being obtained by inserting springs 38 between the forks 34 and the bars 35. The lower bars are adjustably secured in any suitable manner so that more or less tension may be imparted to the springs without altering the roller spacing.

39 indicates a beater formed of four transverse bars secured to and spaced equidistant around a shaft 40 and arranged close to the periphery of the main roller and the upper surface of a grating 42, through which grating the seeds fall to be collected by any suitable means.

The main roller 7 is driven from any suitable source by means of a belt (not shown) passed around the pulley 9 and on the opposite end of the roller shaft are pulleys 43 and 44, a crossed belt 45 passing round pulley 43 and a pulley 46 on the beater shaft 40 to drive the beater in the opposite direction from the main roller, while a cross belt 47 passes round the pulley 44 and a pulley 48 secured to the transverse shaft 29, on which shaft are secured respectively sprockets 49 and 50, the sprockets 49 driving the corrugated roller 28 by means of belt 51 and sprocket 52, while sprocket 50 drives the "distributor" by means of belt 53, sprocket 54, sprocket 55, belt 56, and sprocket 57, sprockets 54 and 55 being secured to shaft 14. The "retarder" is driven by means of a crossed belt 58 passed around pulleys 59 and 60 on the shaft 14 and "retarder" shaft 13 respectively, while the conveyor 4 is driven from the retarder shaft by the sprockets 61 and 62 and belt 63, and in order to stop the operation of the "retarder" and conveyor should too much flax be passing into the machine, a throw-out clutch is provided, as indicated in Figs. 1 and 2 and shown in detail in Figs. 3 and 4. This clutch consists of an adjustable arm 64 one end of which is mounted on the "distributor" shaft while its lower end is forked and formed wedge-shaped, as at 65 in Fig. 3, being adapted to fit between the collars 65$^a$ and 65$^b$ of the movable portion 66 of a clutch member slidably mounted on the "retarder" shaft having notches 68 co-operating with notches 69 formed in the other clutch member 70 which is secured to the "retarder" shaft and which portion is also provided with notches 71 adapted to co-act with a suitably fulcrumed pawl 72 actuated at the proper moment by a finger 73 formed on the arm 64, from which it will be seen that if the arm 64 be drawn upwardly as will be described later the wedge 65 will force the member 66 out of engagement with the member 70, and as the member 66 is continuously rotated by means of pulley 60 which is secured to it, the rotation of the "retarder", and consequently of the conveyor, will be automatically stopped, the operation, however, being automatically started again when the arm 64 returns to its normal position and allows the clutch member 66 to reengage member 70, the member 66 being moved laterally inward by a spring 74. The "retarder" is held against inadvertent rotation while the clutch is out by the engagement of the pawl 72, the pawl having been swung downwardly at its notch-engaging end by the contact of the finger 73 with its upper end as the arm 64 moves upwardly.

The operation of the machine is as follows:—The flax is fed on to the conveyor 4 which deposits it on the chute 10 where it is caught by the "retarder" and "distributor" fingers and carried along to pass between the rollers 28—32—33 and the main roller 7, the flax bolls being crushed as they pass under the rollers 32 and 33 so that when struck by the revolving beater as they pass from these rollers the seeds will fall out and drop through the grating 42, while the deseeded flax passes on to be separated from the straw as in ordinary grain threshers.

From the foregoing it will be seen that I have devised a simple, practical and efficient machine for deseeding flax without injuring the fibre.

What I claim as my invention is—

1. In combination, a conveyor, a chute leading therefrom, a shaft geared to said conveyor to drive the same, a stationary clutch member rigid on said shaft, a second clutch member slidably and revolubly mounted on the shaft, and normally engaged with said stationary clutch member, means for revolving said second clutch member, and means for sliding said second clutch member into and out of engagement with said stationary clutch member, said last mentioned means comprising a movable rod having a wedge-shaped portion slidably engaged with said second member, and means for actuating said rod controlled by the level of the material passing from the conveyor over the said chute.

2. The combination with a conveyor, of a shaft for driving said conveyor, a stationary clutch member fixed to said shaft, a sliding clutch member engageable with said stationary member and revolubly mounted on the shaft, means for rotating said sliding clutch member, means controlled by the level of the material passing from the conveyor for moving said sliding clutch member out of engagement with the stationary clutch member, said means including an arm slidably engaged with the sliding clutch member and adapted when actuated to move said clutch member out of engagement with the stationary member, and means for automatically returning the sliding clutch member to normal position after each disengagement thereof.

3. The combination with a conveyor, of a shaft mounted in advance of the conveyor and having retarding fingers thereon adapted to pass upwardly through the material feeding from the conveyor, said retarder shaft being geared to the conveyor to drive the same, a distributor shaft located above and in advance of said retarder shaft and provided with distributing means engageable with the material passing therebeneath, means mounting said distributor shaft for vertical movement, a clutch on the retarder shaft, and means extending between the distributor and retarder shafts adapted when the distributor shaft is elevated a predetermined distance by the material passing therebeneath to separate the clutch members, and thereby render the retarder shaft and conveyor inactive to prevent further feed until the amount of material on the conveyor returns to normal.

4. In a feed control, the combination with a conveyor for feeding material, of a shaft for driving said conveyor, a stationary clutch member fixed to said shaft, a second clutch member normally engaged with said stationary clutch member and slidably and rotatably mounted on said shaft, means for rotating said second clutch member to operate said shaft and conveyor, and means controlled by the level of the material passing from the conveyor adapted to render the conveyor inactive when an excessive amount of material is being fed therefrom, said controlling means comprising a vertically movable shaft supported to rise and fall with the level of the material passing from the conveyor, and a movable rod connected at one end to said last-mentioned shaft and at the opposite end to the second clutch member, said rod having a wedge-shaped portion slidably engaging the second clutch member and effective to move the clutch member out of engagement with the stationary clutch member when the rod is actuated.

Dated at Chillinack, B. C., this 21st day of December, 1918.

HOKAN LUDVIG LARSON.